United States Patent [19]

Senzaki et al.

[11] Patent Number: 4,592,041
[45] Date of Patent: May 27, 1986

[54] HEAD FOR RECORDING AN INFORMATION SIGNAL IN AND REPRODUCING THE SAME FROM A SEMICONDUCTOR RECORDING MEDIUM

[75] Inventors: Shigeo Senzaki, Yokohama; Jun-ichiro Ikeuchi; Toshikazu Matsui, both of Tokyo; Norikazu Sawazaki, Yokohama, all of Japan

[73] Assignee: Tokyo Shibaura Denki Kabushiki Kaisha, Kawasaki, Japan

[21] Appl. No.: 551,933

[22] Filed: Nov. 15, 1983

[30] Foreign Application Priority Data

Nov. 29, 1982 [JP] Japan ................................. 57-207702

[51] Int. Cl.⁴ ............................................. G11B 9/00
[52] U.S. Cl. .................................... 369/126; 369/173
[58] Field of Search ................ 369/126, 173, 145, 151

[56] References Cited

U.S. PATENT DOCUMENTS

| | | | |
|---|---|---|---|
| 2,892,898 | 6/1959 | Lubow | 369/126 |
| 4,104,832 | 8/1978 | Keizer | 369/173 |
| 4,247,120 | 1/1981 | Dunn | 369/173 |
| 4,340,953 | 7/1982 | Iwamura | 369/126 |

FOREIGN PATENT DOCUMENTS 56-58147  5/1981  Japan .
56-134333  10/1981  Japan .
1487260  9/1977  United Kingdom .

OTHER PUBLICATIONS

Patent Abstracts of Japan, unexamined applications, P section, vol. 6, No. 8, Jan. 19, 1982 (Kokai-No. 56-134 333, No. 56-134 332. (Sanyo)).
Patent Abstracts of Japan, unexamined applications, P section, vol. 5, No. 118, Jul. 30, 1981 (Kokai-No. 56-58 147 (Hitachi)).

*Primary Examiner*—Alan Faber
*Attorney, Agent, or Firm*—Oblon, Fisher, Spivak, McClelland & Maier

[57] ABSTRACT

A head for recording an information signal in and reproducing the same from a semiconductor recording medium comprises an electrode stylus for recording and reproducing recording information by relatively sliding on the semiconductor recording medium, the recording information being recorded and reproduced through the electrode stylus, and a nonconductive supporting substrate, provided on the side surface of the electrode stylus, for supporting the electrode stylus. A hardness of the electrode stylus is lower than a hardness of a surface medium which constitutes the semiconductor recording medium and is higher than a hardness of the supporting substrate.

14 Claims, 8 Drawing Figures

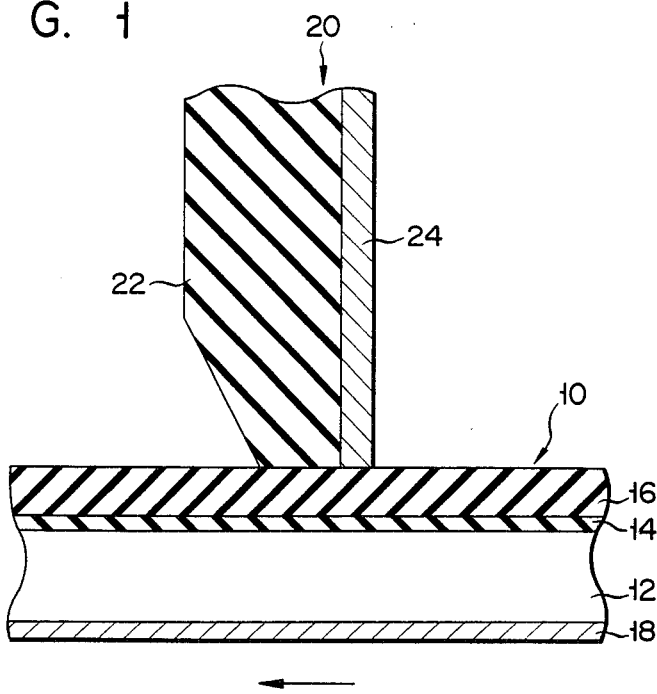
F I G. 1
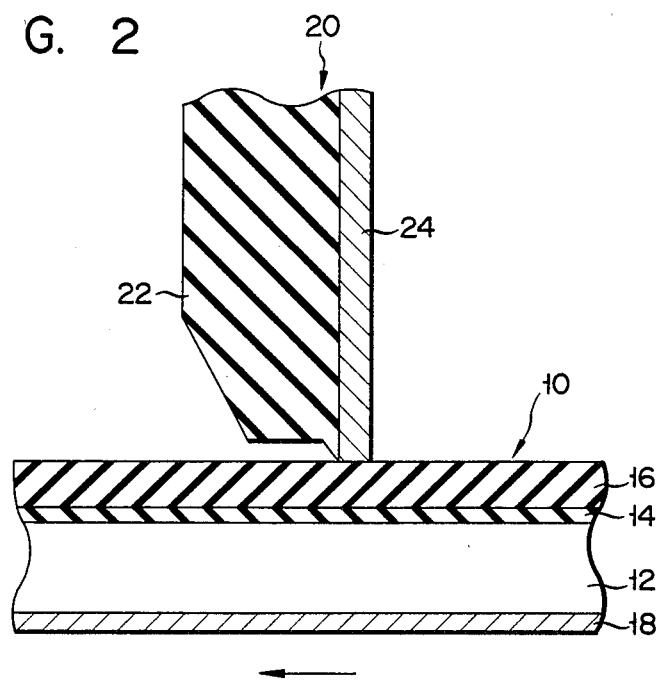
F I G. 2

HEAD FOR RECORDING AN INFORMATION SIGNAL IN AND REPRODUCING THE SAME FROM A SEMICONDUCTOR RECORDING MEDIUM

BACKGROUND OF THE INVENTION

This invention relates to a head for recording in and reproducing from a semiconductor recording medium which can be electrically rewritten an information signal through an electrode stylus which relatively slides on that medium.

A method is known whereby an information signal, e.g., a video signal and an audio signal is arbitrarily recorded and reproduced with high density using a recording medium consisting of a semiconductor. This method is disclosed in U.S. Pat. No. 4,340,953. The recording medium comprises a semiconductor substrate consisting of, e.g., monocrystal Si and an insulation film which is formed on this semiconductor substrate and has a charge storage function. The above insulation film is a double-layer film consisting of a $SiO_2$ film and a $Si_3N_4$ film formed on this $SiO_2$ film. A conductive recording and reproducing head moves relatively on this recording medium. A signal voltage is applied through the head in the direction of a thickness of the recording medium, so that the signal charges are stored in the insulation film. On the other hand, the depletion layer is formed in the semiconductor substrate in response to the signal charges stored. By detecting the electrostatic capacity in the direction of a thickness of the recording medium due to this depletion layer by means of the recording and reproducing head which moves relative to the recording medium, the stored information is reproduced.

The reproducing stylus of the pickup to be used for a video disc of the electrostatic capacity type is constituted as disclosed in, for example, a Japanese Patent Laid-open Application 56-58147 and 56-134333. The recording and reproducing head to be used for the recording and reproducing method using a semiconductor recording medium is also constituted in the same manner as the reproducing stylus to be used for the above-mentioned electrostatic capacity type video disc, i.e., an electrode stylus is attached to the side surface of an electrode supporting substrate. However, different from the reproducing stylus of the electrostatic capacity type video disc, the electrode stylus of this kind is also used as a recording stylus and a signal voltage is applied to the stylus when recording information. As described above, since their use methods are quite different, it was found that such an electrode stylus has the following peculiar problems that were not caused for the reproducing stylus for the electrostatic capacity type video disc.

(1) Since the electrode stylus slides on the recording medium which rotates at a high speed, an excellent wear resistance is required. On the contrary, when the hardness of the electrode stylus is higher than that of the recording medium, the recording medium will have been damaged. This is because the semiconductor recording medium is harder and has a less elasticity as compared with the electrostatic capacity type video disc. If a hard stylus such as diamond like a conventional reproducing stylus for electrostatic capacity type video discs is used for the electrode supporting substrate, the electrode stylus will float over the surface of the recording medium and the preferable contact relation will not be provided since the abrasion of the electrode stylus is larger than that of the supporting substrate. In the method using a semiconductor recording medium, since a signal voltage is applied through the electrode stylus and the recording is performed, it is an inevitable requirement to secure the excellent contact relation between the electrode stylus and the recording medium in order to improve the recording performance. A poor contact relation will adversely disable the recording and reproduction of images.

(2) In the recording and reproducing method using a semiconductor recording medium, while a voltage is applied to the electrode stylus to record a signal, a fairly large current of 100 A/cm² or more flows, causing the Joule heat to be produced. Furthermore, since the electrode stylus slides on the recording medium or disc which rotates at a high speed of, e.g., 1800 rpm, the frictional heat is also produced. Hence, a large amount of thermal and mechanical load is applied to the electrode stylus. Thus, the electrode stylus may be easily peeled from the electrode supporting substrate due to a difference in thermal expansion coefficient between the electrode stylus and the electrode supporting substrate, mechanical vibration to which the electrode is subject, and sliding friction.

The film forming the electrode stylus may be thickened to diminish such thermal and mechanical load to be applied to the electrode stylus and to prevent the electrode stylus from being broken. However, to maintain the resolution of the information signal which is recorded and reproduced to be a predetermined level or more, a thickness of the film of the electrode stylus must be 0.5 μm or less.

SUMMARY OF THE INVENTION

It is an object of the present invention to provide a recording and reproducing head in which even when the abrasion is occurred in an electrode stylus, the head can come into contact with a semiconductor recording medium with a high degree of accuracy, thereby enabling a signal to be effectively recorded and reproduced.

Another object of the present invention is to provide a recording and reproducing head in which the electrode stylus is difficult to be removed from an electrode supporting substrate.

These and other objects have been attained by the head for recording an information signal in and reproducing the same from a semiconductor recording medium comprising an electrode stylus having a lower hardness than that of a surface medium constituting the semiconductor recording medium, this electrode stylus relatively sliding on the semiconductor recording medium, and the recording information being recorded and reproduced through the electrode stylus, and a nonconductive supporting substrate, provided on the side surface of the electrode stylus, for supporting the electrode stylus, the hardness of the supporting substrate being lower than that of the electrode stylus.

With such a construction, since the hardness of the electrode stylus is lower than that of the surface material of the semiconductor recording medium, the semiconductor recording medium will not be damaged by the electrode stylus. In addition, since the hardness of the electrode stylus is higher than that of the electrode supporting substrate, the abrasion of the supporting substrate is larger than that of the electrode stylus.

Therefore, the electrode stylus always protrudes from the supporting substrate and the surface of the stylus is always refreshed, this ensures a preferable contact relation between the recording medium and the electorode stylus, thereby allowing the information to be efficiently recorded and reproduced.

Furthermore, by providing an intermediate conductive layer between the electrode stylus and the supporting substrate, it is possible to prevent the breaking of the electrode stylus due to the current flowing while the voltage is being applied. The use of a material of an intermediate conductive layer, having an excellent adhesive property with respect to both electrode stylus and supporting substrate, makes it possible to prevent the electrode stylus from being removed from the supporting substrate.

In addition, if an electrode protective layer which is as hard as or softer than the electrode stylus and which is harder than the electrode supporting substrate is provided on the surface of the electrode stylus, the abrasion resistance of the electrode stylus can be improved. The protective layer also has a function for prevention of the breaking of the head since it further serves to conduct the Joule heat and frictional heat.

BRIEF DESCRIPTION OF THE DRAWINGS

Other objects and advantages will be apparent from the following description taken in conjunction with the accompanying drawings in which:

FIG. 1 is a cross sectional view of a semiconductor recording medium and a recording and reproducing head of an embodiment of the present invention;

FIG. 2 is a diagram showing a change of the shape of the recording and reproducing head when it is used;

DETAILED DESCRIPTION OF THE PREFERRED EMBODIMENTS

Figure 3:
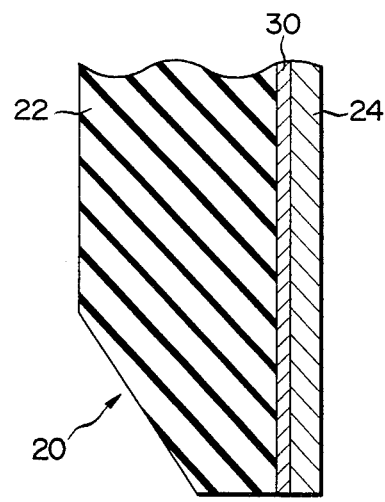
FIGS. 3 to 6 are cross sectional views showing the recording and reproducing head of other embodiments of the present invention.

The first embodiment of a recording and reproducing head according to the present invention will now be described with reference to FIG. 1.

A semiconductor recording medium 10 comprises: a semiconductor substrate 12 consisting of, e.g., Si; a $SiO_2$ film 14 formed on one surface of the semiconductor substrate 12; a $Si_3N_4$ film 16 formed on the $SiO_2$ film 14; and a conductive layer 18 formed on the other surface of the semiconductor substrate 12. A recording and reproducing head 20 according to the present invention comprises: an electrode supporting substrate 22 consisting of a nonconductive material, e.g., a galss or quartz; and an electrode stylus 24 formed on one surface of the electrode supporting substrate 22. The electrode stylus 24 is formed using a conductive material, for example, tungsten W, molybdenum Mo, copper Cu or alloy of copper, e.g., Cu-Be which is harder than the supporting substrate 22 and is softer than the $Si_3N_4$ film 16 which is the surface medium of the semiconductor recording medium 10.

When the recording and reproducing head 20 is constituted as described above, since the electrode stylus 24 is softer than the $Si_3N_4$ film 16 which is the surface medium of the semiconductor recording medium 10, even when the head 20 relatively slides on the semiconductor recording medium 10 in the direction indicated by an arrow, the semiconductor recording medium 10 will not be damaged. Furthermore, since the hardness of the electrode stylus 24 is higher than that of the electrode supporting substrate 22, the abrasion of the supporting substrate 22 is larger than that of the electrode stylus 24 when the head 20 is repeatedly used, so that the head 20 will become the shape as shown in FIG. 2. Since the electrode stylus 24 protrudes from the supporting substrate 22, the surface of the electrode stylus 24 is always refreshed and, accordingly, the preferably contact relation is maintained between the electrode stylus 24 and the surface of the semiconductor recording medium 10, thereby enabling the recording and reproducing to be always performed under the good condition.

On the other hand, to prevent the peeling of the electrode stylus due to the Joule heat and frictional heat, the respective materials of the supporting substrate 22 and electrode stylus 24 must be suitably selected so that each thermal expansion coefficient of them coincides.

A reproducing stylus which is used for a conventional electrostatic capacity type video disc consists of a supporting substrate of, e.g., diamond, and an electrode stylus of, e.g, titanium, and the video disc is made of vinyl chloride resin. Thus, a hardness of the supporting substrate is the highest, and that of the electrode stylus is the next, and a hardness of the film of the video disc is the lowest. This relation is opposite to the relation in the recording and reproducing head of the present application. Consequently, if a conventional recording and reproducing head would be used for a semiconductor recording medium, the abrasion of the electrode stylus would be more than that of the supporting substrate, so that a desirable contact relation between the electrode stylus and the recording medium cannot be provided and the good recording and reproduction cannot be performed.

The second embodiment according to the present invention will now be described with reference to FIG. 3. In this embodiment, to increase the adhesive force of the electrode stylus 24 with the supporting substrate 22, an intermediate conductive layer 30 is provided which has an excellent adhesive property with respect to both of the electrode stylus 24 and the supporting substrate 22. This intermediate conductive layer 30 is generally formed by an evaporation method. A thickness of the film of the intermediate conductive layer 30 must be extremely thin as compared with a film thickness of the electrode stylus 24. This is because the thick intermediate conductive layer 30 causes the resolution of the head 20 to substantially deteriorate.

In this way, the formation of the intermediate conductive layer 30 allows the adhesive strength between the electrode stylus 24 and the supporting substrate 22 to increase. Thus, even if a large recording current flows and the large amount of heat is produced upon recording, the electrode stylus 24 will not be removed from the supporting substrate 22 owing to this intermediate conductive layer 30. The presence of the intermediate conductive layer 30 reduces the load to be applied directly to the electrode stylus 24; therefore, the electrode stylus can withstand a large recording current.

A practical sample of FIG. 3 will be described hereinbelow.

SAMPLE 1

In FIG. 3, in the case where the electrode supporting substrate 22 is formed by a glass or quartz and the electrode stylus 24 is made of copper or an alloy thereof, such as Cu-Be, the intermediate conductive layer 30 may be formed by Nichrome, chromium, manganese, or titanium. The intermediate conductive layer 30 having a thickness of 300 Å is formed on the supporting substrate 22 by the EB (electron-beam evaporation) method, then the electrode stylus 24 having a thickness of 1500 Å is formed on the intermediate conductive layer 30 by the EB evaporation. Next, this stylus assembly is worked into a predetermined shape to manufacture the recording and reproducing head 20. Since Nichrome, chromium, manganese, or titanium has a good adhesive property with respect to both of the electrode supporting substrate 22 and the electrode stylus 24, the peeling will not occur between the electrode stylus 24 and the supporting substrate 22 of the recording and reproducing head 20 formed in such a manner as described above, so that a good reproduced picture could be obtained.

SAMPLE 2

In FIG. 3, 80:20 wt. % of nickel-chromium is EB evaporated on the electrode supporting substrate 22 consisting of a square-pillar-like glass formed into a predetermined shape, thereby forming the intermediate conductive layer 30 having a thickness of 200 Å. Molybdenum is evaporated on this intermediate conductive layer 30 by the EB evaporation method to form the electrode stylus 24 having a thickness of 2000 Å. The EB evaporation is carried out at 250° to 500° C. This is because each interface is diffused and fused to increase the adhesive strength of each interface. While the electrode stylus 24 of the head 20 which was formed in this way is used, it always exhibits an excellent conductive property and no peeling occurred. Thus, the good recording and reproducing could be performed using this head 20.

Figure 4:
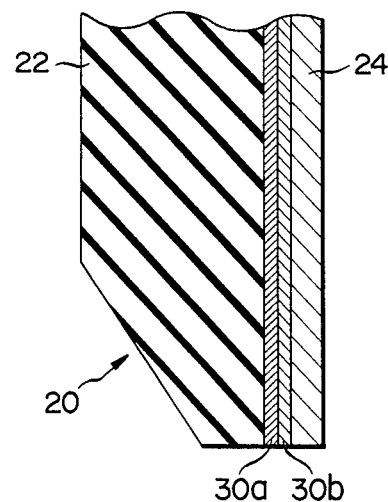

Next, the third embodiment according to the present invention will be described with reference to FIG. 4. In this embodiment, a first intermediate conductive layer 30a is provided to increase the adhesive strength with the supporting substrate 22, and a second intermediate conductive layer 30b is provided to increase the adhesive strengths of the first intermediate conductive layer 30a and the electrode stylus 24. As already described, film thicknesses of the first and second intermediate conductive layers 30a and 30b must be extremely thin to prevent the deterioration of the resolution of the head 20. If the intermediate conductive layers 30a and 30b are formed at such a temperature that each interface of the layers is diffused and fused with each other to increase the adhesive strength of each layer, the extremely thin intermediate conductive layers can be formed.

A practical sample of FIG. 4 will be described hereinbelow. Manganese Mn having a thickness of 200 Å is evaporated as the first intermediate conductive layer 30a on the electrode supporting substrate 22 formed of a galss fiber, then molybdenum Mo having a thickness of 600 Å is evaporated as the second intermediate conductive layer 30b. Next, tungsten W having a thickness of 4000 Å is evaporated as the electrode stylus 24 on the second intermediate conductive layer 30b at hundreds of degrees of centigrade (°C.) or more. When a picture signal was recorded using the recording and reproducing head formed in this way, a good reproduced picture could be obtained.

Figure 5:
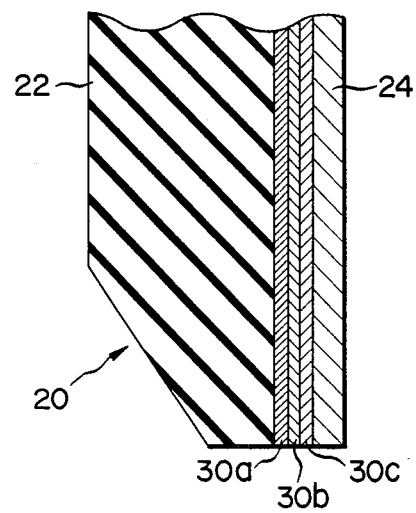

The fourth embodiment according to the present invention will be described with reference to FIG. 5. The electrode supporting substrate 22 is formed of a galss fiber having a thermal expansion coefficient near a thermal expansion coefficient of molybdenum Mo or tungsten W. The first intermediate conductive layer 30a 100 to 200 Å thick is formed on this supporting substrate 22 by evaporating or sputtering chromium. The second intermediate conductive layer 30b having 100 to 200 Å thick is then formed on the first intermediate conuctive layer 30a by evaporating or sputtering manganese. Furthermore, a third intermediate conductive layer 30c 600 Å or less thick is formed on the second intermediate conductive layer 30b by sputtering molybdenum. Next, the electrode stylus 24 3000 to 5000 Å thick is formed on the third intermediate conductive layer 30c by sputtering tungsten. Thereafter this stylus assembly is subject to heat treatment at 500° C. or more, thereby to manufacture the recording and reproducing head 20. Chromium has a good adhesive property with a glass fiber, while molybdenum has a good adhesive property with tungsten. In addition, manganese has a good adhesive property with chromium and molybdenum. When the recording and reproduction of information were performed using this head 20, the good recording and reproduction with an excellent conductivity and without any peeling could be advantageously done.

Figure 6:
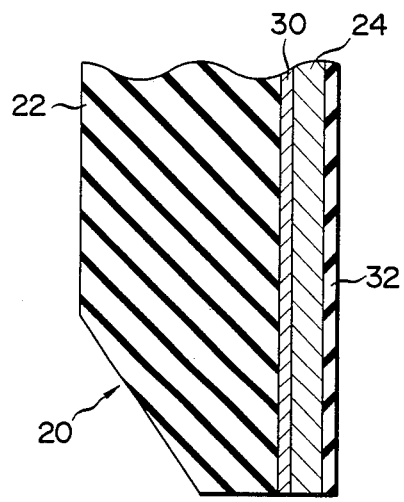
Figure 7:
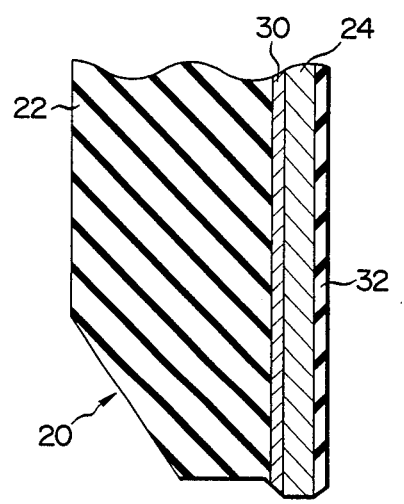
FIG. 7 shows the shape of the recording and reproducing head of FIG. 6 after it has been used for some time.

Still another embodiment according to the present invention will be described with reference to FIG. 6. This recording and reproducing head 20 comprises: the electrode supporting substrate 22; electrode stylus 24; intermediate conductive layer 30 formed between the electrode supporting substrate 22 and the electrode stylus 24; and a protective layer 32 formed on the surface of the electrode stylus 24. This protective layer 32 is formed of a metal oxide of, e.g., silica, alumina, beryllium oxide, tin oxide, or titanium oxide. The protective layer 32 may be formed of a metal nitride having a poor electrical conductivity, such as silicon nitride. The above-mentioned metal oxide and metal nitride have an excellent thermal conductivity, so that it serves to reduce the thermal load to be applied to the head 20. A film thickness of the protective layer 32 is selected to be 1/5–½ of the thickness of the electrode stylus 24 so as not to make the resolution deteriorate. Moreover, a hardness of the protective layer 32 is selected to be equal to or lower than that of the electrode stylus 24 and to be higher than the hardness of the electrode supporting substrate 22. By providing such a protective layer 32, the electrode stylus 24 is allowed to always protrude from the supporting substrate 22 and protective layer 32 as shown in FIG. 7, so that this secures a preferable contact relation with the recording medium. Furthermore, since this protective layer 32 provides a good thermal conductivity, it is possible to prevent the breaking of the head 20 due to the current flowing while a voltage is applied to the electrode stylus 24. In addition, since the corrosion of the electrode surface is prevented with the aid of the presence of the protective layer 32, this results in an improvement in abrasion resistance of the head 20.

A practical sample of FIG. 6 will now be described hereinbelow. The intermediate conductive layer 30 300 Å thick, consisting of one of Nichrome, chromium, manganese, and titanium is formed on the electrode supporting substrate 22 consisting of a glass or quartz.

The electrode stylus 24 1500 Å thick, consisting of copper or alloy thereof is formed on this intermediate conductive layer 30. Silica or alumina is evaporated on this electrode stylus 24 by the EB evaporation method, thereby forming the recording and reproducing head 20 which is 500 Å thick. The extremely thin $Al_2O_3$ film becomes porous and becomes softer than ordinary bulk-like $Al_2O_3$. Therefore, the relations in hardness among the electrode supporting substrate, electrode stylus and protective layer are maintained. As a result of the recording and reproduction of a picture signal using this recording and reproducing head 20, a more stable reproduced picture could be obtained as compared with the electrode stylus without a protective layer.

Figure 8:
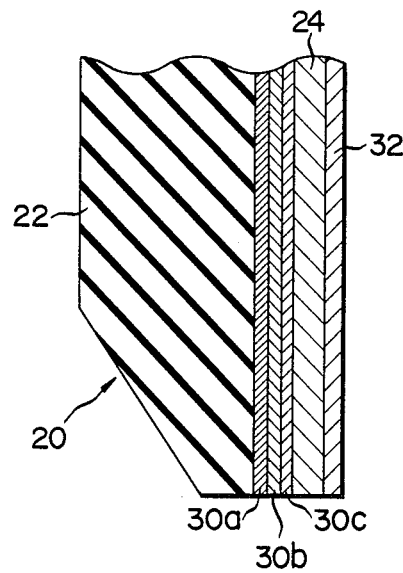
FIG. 8 is a cross sectional view of the recording and reproducing head of still another embodiment of the present invention.

A further another embodiment according to the present invention will be described with reference to FIG. 8. This embodiment employs a conductive super hard alloy such as a metal nitride or metal carbide as the protective layer 32 of the electrode stylus 24. The protective layer 32 is formed of a material having a relatively good electrical conductivity, such as titanium nitride, titanium carbide, or silicon carbide. Consequently, the current density of the electrode stylus 24 reduces and the stylus can withstand a large recording current. A film thickness of this protective layer 32 is selected to be 1/5 to ½ of a thickness of the electrode stylus 24 to prevent the deterioration of the resolution. Moreover, a hardness of the protective layer 32 is selected to be equal to or lower than that of the electrode stylus 24 and to be higher than the hardness of the electrode supporting substrate 22. By providing such a conductive protective layer 32, it is possible to produce the head 20 which further provides an excellent electrical characteristic in addition to the effect due to the protective layer as already described with respect to FIG. 6.

A typical embodiment will be described hereinbelow. Nichrome having a 80:20 wt. % is sputtered on the electrode supporting substrate consisting of quartz or hard glass, thereby to form the first intermediate conductive layer 30a having a thickness of 200 Å. Then, manganese is sputtered on the first intermediate conductive layer 30a to form the second intermediate conductive layer 30b having a thickness of 200 Å. Molybdenum is further sputtered on the second intermediate conductive layer 30b, thereby forming the third intermediate conductive layer 30c having a thickness of 600 Å of less. Next, tungsten is sputtered on the third intermediate conductive layer 30c to form the electrode stylus 24 3000 Å thick. Hard metal, e.g., titanium nitride TiN or titanium carbide TiC, is deposited on this electrode stylus 24 by the CVD, (chemical vapor deposition), thus forming a film 500 Å thick. Thereafter a heat treatment is performed at 800° C. in an inert gas, for example, Ar or $N_2$ to produce the recording and reproducing head 20. This head 20 has superior conductivity and abrasion resistance, and the good recording and reproduction can be done.

What is claimed is:

1. A head for recording an information signal in and reproducing the same from a semiconductor recording medium comprising:
   an electrode stylus having a lower hardness than that of a surface medium which constitutes said semiconductor recording medium, said electrode stylus relatively sliding on the semiconductor recording medium, and recording information being recorded and reproduced through said electrode stylus; and
   a nonconductive supporting substrate, provided on the side surface of said electrode stylus, for supporting the electrode stylus, a hardness of said supporting substrate being lower than the hardness of said electrode stylus.

2. A head according to claim 1, wherein said electrode stylus is formed of at least one member selected from the group consisting of tungsten W, molybdenum Mo, copper Cu, and alloy of copper; and
   said supporting substrate is formed of a member selected from the group consisting of glass and quartz.

3. A head according to claim 1, further comprising:
   a protective layer, formed on the other side surface of said electrode stylus, for protecting the electrode stylus, a hardness of said protective layer being equal to or lower than the hardness of the electrode stylus and being higher than the hardness of said electrode supporting substrate.

4. A head according to claim 3, wherein said protective layer is formed of at least one member selected from the group consisting of silicon oxide, aluminum oxide, beryllium oxide, tin oxide, titanium oxide, silicon nitride, titanium nitride, titanium carbide, and silicon carbide.

5. A head according to claim 3, wherein said protective layer is formed of at least one member selected from the group consisting of a metal oxide, metal nitride, and metal carbide, a film thickness of said protective layer being 1/5 to ½ of the film thickness of the electrode stylus.

6. A head according to claim 5, wherein said protective layer is formed of hard metal.

7. A head for recording an information signal in and reproducing the same from a semiconductor recording medium comprising:
   an electrode stylus having a lower hardness than that of a surface medium which constitutes said semiconductor recording medium, said electrode stylus relatively sliding on said semiconductor recording medium, and recording information being recorded and reproduced through said electrode stylus;
   a supporting substrate, provided on the side surface of said electrode stylus, for supporting the electrode stylus, a hardness of said supporting substrate being lower than that of the electrode stylus; and
   at least one intermediate conductive layer, provided between said supporting substrate and said electrode stylus, for improving an adhesive property of the electrode stylus with the supporting substrate, a hardness of said intermediate conductive layer being lower than the hardness of said electrode stylus.

8. A head according to claim 7, wherein said electrode stylus is formed of at least one member selected from the group consisting of tungsten W, molybdenum Mo, copper Cu, and alloy of copper;
   said supporting substrate is formed of a member selected from the group consisting of glass and quartz; and
   said intermediate conductor layer is formed of at least one member selected from the group consisting of chromium, manganese, titanium, molybdenum, and nickel-chromium alloy.

9. A head according to claim 7, wherein a thickness of said intermediate conductive layer is 200 to 1000 Å.

10. A head according to claim 7, further comprising a protective layer, formed on the other side surface of said electrode stylus, for protecting the electrode stylus, a hardness of said protective layer being equal to or lower than the hardness of said electrode stylus and being higher than the hardness of said electrode supporting substrate.

11. A head according to claim 10, wherein said protective layer is formed of at least one member selected from the group consisting of silicon oxide, aluminum oxide, beryllium oxide, tin oxide, titanium oxide, silicon nitride, titanium nitride, titanium carbide, and silicon carbide.

12. A head according to claim 10, wherein said protective layer is formed of at least one member selected from the group consisting of a metal oxide, metal nitride, and metal carbide, a film thickness of said protective layer being 1/5 to ½ of the film thickness of the electrode stylus.

13. A head according to claim 12, wherein said protective layer is formed of hard metal.

14. A head for recording an information signal in and reproducing the same from a semiconductor recording medium comprising:

an electrode stylus having a lower hardness than that of a surface medium which constitutes said semiconductor recording medium, said electrode stylus relatively sliding on said semiconductor recording medium, and recording information being recorded and reproduced through said electrode stylus;

a supporting substrate, provided on the side surface of said electrode stylus, for supporting the electrode stylus, a hardness of said supporting substrate being lower than the hardness of said electrode stylus; and an intermediate conductive layer which is provided between said supporting substrate and said electrode stylus and has a lower hardness than that of the electrode stylus, said intermediate conductive layer consisting of a first intermediate conductive layer having a good adhesive property with said supporting substrate, a second intermediate conductive layer having a good adhesive property with said electrode stylus, and a third intermediate conductive layer having a good adhesive property with said first and second intermediate conductive layers.

* * * * *